US006288143B1

(12) United States Patent
Caradori et al.

(10) Patent No.: US 6,288,143 B1
(45) Date of Patent: Sep. 11, 2001

(54) FILLER/SILICONE OIL MASTERBATCH WITH TREATING AGENT FOR RTV POLYSILOXANES

(75) Inventors: Paul J. Caradori, Waterford; Robert Augustine Smith; Michael Allen Zumbrum, both of Clifton Park, all of NY (US)

(73) Assignee: General Electric Company, Pittsfield, MA (US)

( * ) Notice: Subject to any disclaimer, the term of this patent is extended or adjusted under 35 U.S.C. 154(b) by 1513 days.

(21) Appl. No.: 08/646,646

(22) Filed: May 3, 1996

Related U.S. Application Data

(63) Continuation of application No. 08/418,911, filed on Apr. 7, 1995, now abandoned, which is a continuation of application No. 08/209,044, filed on Mar. 10, 1994, now abandoned.

(51) Int. Cl.[7] .............................. C08K 3/36; C08K 9/06; C08L 83/04; C08L 83/07
(52) U.S. Cl. ...................... 523/213; 523/212; 524/588
(58) Field of Search ................... 523/213, 212; 524/588

(56) References Cited

U.S. PATENT DOCUMENTS

| | | | |
|---|---|---|---|
| 2,843,555 | 7/1958 | Berridge | 260/18 |
| 2,938,009 | 5/1960 | Lucas | 260/37 |
| 3,004,859 | 10/1961 | Lichtenwalner | 106/308 |
| 3,035,016 | 5/1962 | Bruner | 260/46.5 |
| 3,133,891 | 5/1964 | Ceyzeriat | 260/18 |
| 3,175,993 | 3/1965 | Weyenberg | 260/46.5 |
| 3,419,635 | 12/1968 | Vaughn | 260/824 |
| 3,635,743 | 1/1972 | Smith | 106/288 Q |
| 3,708,467 | 1/1973 | Smith et al. | 260/185 |
| 3,730,938 | 5/1973 | Smith et al. | 260/37 SB |
| 3,847,848 | 11/1974 | Beers | 260/18 S |
| 3,925,277 | 12/1975 | Lampe | 260/18 S |
| 3,929,718 * | 12/1975 | Kratel et al. | 523/213 |
| 3,956,209 | 5/1976 | Hamilton, Jr. et al. | 260/18 S |
| 3,957,704 | 5/1976 | Smith et al. | 260/18 S |
| 4,007,153 | 2/1977 | Smith | 260/33.6 SB |
| 4,116,919 * | 9/1978 | Elias et al. | 523/213 |
| 4,261,758 | 4/1981 | Wright et al. | 106/287.12 |
| 4,388,433 | 6/1983 | Klein et al. | 524/401 |
| 4,465,818 | 8/1984 | Shirahata et al. | 528/12 |
| 4,490,500 | 12/1984 | Smith | 524/378 |
| 4,560,711 * | 12/1985 | Suzuki | 523/213 |
| 4,585,830 * | 4/1986 | Sweet | 523/213 |
| 4,882,368 * | 11/1989 | Elias et al. | 523/213 |
| 5,013,772 * | 5/1991 | Fujiki et al. | 523/213 |

FOREIGN PATENT DOCUMENTS

| | | |
|---|---|---|
| 0234226 | 2/1987 | (EP) . |
| A-0568891 | 10/1993 | (EP) . |
| A-904548 | 5/1958 | (GB) . |

\* cited by examiner

*Primary Examiner*—Robert E. L. Sellers
(74) *Attorney, Agent, or Firm*—Kenneth S. Wheelock

(57) ABSTRACT

A method for preparing the first component of a two-component room temperature-vulcanizable (RTV) silicone composition comprises (a) preparing a filler/oil masterbatch by (i) adding an unreactive silicone oil and untreated, aggregated filler particles to a mixer; (ii) adding a filler treating agent such as an organosilane, a polyorganosilane or a silazane to the unreactive silicone oil/filler mixture; and (iii) mixing the unreactive silicone oil/filler mixture and treating agent under conditions sufficient to breakdown the aggregated filler particles to an average size of less than about 300 nm for a time of less than about 24 hours to form the filler/oil masterbatch; and (b) adding said filler/oil masterbatch to a reactive silicone oil.

10 Claims, No Drawings

FILLER/SILICONE OIL MASTERBATCH WITH TREATING AGENT FOR RTV POLYSILOXANES

This is a continuation of Ser. No. 08/418,911 filed on Apr. 7, 1995, now abandoned, which is a continuation of Ser. No. 08/209,044, filed Mar. 10, 1994, also abandoned.

The present invention relates to two-part room temperature vulcanizable (RTV) silicones. More particularly, the present invention relates to a method of treating fillers for use in RTV silicones. Most particularly, the present invention relates to an in-situ filler treating process for RTV silicones which provides improved physical properties.

BACKGROUND OF THE PRESENT INVENTION

Room temperature two-part vulcanizing silicone compositions are presently widely known. For example, Hyde, U.S. Pat. No. 2,571,039 discloses preparing an organosiloxane by compounding a readily deformable acid polymer comprising a polysiloxane and an acidic compound with a filler, and then reacting the compounded material with a silane of the formula $R_nSi(OR')_{4-n}$ where R is a monovalent hydrocarbon radical free of aliphatic unsaturation, R' is an alkyl radical of less than 9 carbon atoms and n has a value of 0 to 1.

Berridge, United States Patent No. 2,843,555 discloses an organopolysiloxane composition convertible at room temperature to the cured, solid, elastic state comprising (a) a linear, fluid organopolysiloxane containing silicon-bonded hydroxy groups and having an average of about two organic groups per silicon atom, (b) an alkyl silicate, and (c) a metallic salt of an organic carboxylic acid.

The compositions are useful as sealants, electrical insulation, coatings, dental cement, caulking compounds, expansion joints, gaskets, shock absorbers, adhesives and in many other applications.

Presently, two-part condensation cure RTV's are typically comprised of an "A" component comprising (1) a dihydroxy or silanol terminated polydiorganosiloxane; (2) a semi-reinforcing filler such as $CaCO_3$ or ground quartz and a reinforcing filler such as fumed silica; and (3) water; and a "B" component comprising (1) a T or Q functional crosslinker; and (2) a condensation cure catalyst.

It is further known in the art to treat the fillers off site with organosilicones or silazanes prior to addition to the two component RTV mixture. See, for example, Lucas, U.S. Pat. Nos. 2,938,009; Lichtenwalner, 3,004,859; and Smith, 3,635,743.

More recently, Treco SRL has developed a low shear process for treating the filler in situ by preparing a filler/oil masterbatch and adding the treating agent to the masterbatch under low shear mixing conditions which do not rapidly break down aggregated filler particles. Although the Treco process has met with some success in the industry, the process requires unsuitable manufacturing times, on the order of at least about 3 to 5 days. Further, materials produced by the Treco process exhibit relatively low Shore A durometer and Die B Tear values.

It would therefore represent a notable advance in the state of the art if a novel method could be found which enabled a user to treat the filler in situ and formulate a two component RTV composition in a significantly shorter manufacturing time to produce a high Shore A durometer material which retained high Die B Tear values.

SUMMARY OF THE PRESENT INVENTION

To this end, the present inventors have now found an in-situ filler treating process for preparing RTV silicones which meet the shortcomings of the prior art processes.

According to the present invention, there is provided an in-situ method of preparing the first component of a two-component RTV silicone composition, the method comprising: (a) preparing a filler/oil masterbatch comprising (i) adding an unreactive silicone oil and untreated aggregated filler particles to a mixer; (ii) adding a filler treating agent to the unreactive silicone oil/filler mixture; and mixing the treating agent and unreactive silicone oil/filler mixture at mixing conditions sufficient to break down the aggregated filler particles to an average size of less than about 300 nm in diameter in a time period of less than about 24 hours; and (b) adding the filler/oil masterbatch to a reactive silicone oil.

According to the present invention there is also provided an in-situ method of preparing a two-component RTV silicone composition, the method comprising: (A) preparing a first component by a method comprising: (a) preparing a filler/oil masterbatch comprising (i) adding an unreactive silicone oil and untreated aggregated filler particles to a mixer; (ii) adding a filler treating agent to the unreactive silicone oil/filler mixture; and (iii) mixing the treating agent and silicone oil/filler mixture at mixing conditions sufficient to break down the aggregated filler particles to an average size of less than about 300 nm in diameter in a time period of less than about 24 hours; (b) adding the filler/oil masterbatch to a reactive silicone oil; and (c) adding a lower molecular weight silicone oil to the mixture of the filler/oil masterbatch and reactive silicone oil; (B) preparing a second component by admixing an effective amount of a condensation cure catalyst and an effective amount of a crosslinking agent; and (C) combining and reacting components (A) and (B) to effect curing of the polysiloxane.

Still further, according to the present invention there is provided a two-component RTV silicone composition having high Shore A durometer and Tear B strength values prepared by a process comprising: (A) preparing a first component by a method comprising: (a) preparing a filler/oil masterbatch comprising (i) adding an unreactive silicone oil and untreated aggregated filler particles to a mixer; (ii) adding a filler treating agent to the unreactive silicone oil/filler mixture; and (iii) mixing the treating agent and unreactive silicone oil/filler mixture at mixing conditions sufficient to break down the aggregated filler particles to an average size of less than about 300 nm in diameter in a time period of less than about 24 hours; and (b) adding the filler/oil masterbatch to a reactive silicone oil; (B) preparing a second component by admixing an effective amount of a condensation cure catalyst and an effective amount of a crosslinking agent; and (C) mixing and reacting components (A) and (B).

DETAILED DESCRIPTION OF THE PRESENT INVENTION

The present invention provides a novel two-part condensation cure RTV silicone and method of making same. The RTV's are typically comprised of an "A" component comprising (1) reactive silicone oils such as a dihydroxy or silanol terminated polydiorganosiloxane; (2) a filler/oil masterbatch comprising an unreactive silicone oil and a treated reinforcing filler such as, for example, fumed silica (90–325 $m^2/g$ surface area); and, optionally, (3) water; and a "B" component comprising (1) a T or Q functional crosslinker; and (2) a condensational cure catalyst.

The two-part condensation cure RTV's of the present invention are prepared by treating the filler in-situ at conditions sufficient to break down the aggregated filler particles to an average size of less than about 300 nm in diameter in less than about 24 hours, preferably less than about 14 hours, during compounding of the "A" component. The "A" and "B" components are then admixed at conditions to effect the curing of the polydiorganosiloxane. Preferably, the "A" and "B" components are admixed in a ratio of from about 80 to about 120 parts by weight of component "A", to from about 1 to about 20 parts by weight of component "B". More preferred is a weight ratio of from about 90 to about 110 parts by weight "A" to from about 2 to about 15 parts by weight "B".

The reactive silicone oil for use in the present invention typically comprises silanol chain-stopped polydiorganosiloxanes and may be represented by the general formula:

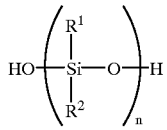

wherein $R^1$ and $R^2$ are each organic radicals of up to 20, and preferably up to 8 carbon atoms, selected from hydrocarbyl, halohydrocarbyl and cyano lower alkyl and n is a number that varies generally from about 10 to about 15000, preferably from about 100 to about 3000, and more preferably from about 300 to about 1500.

The silanol chain-stopped polydiorganosiloxanes are well known in the art and they may be prepared by known methods, such as described in Beers, U.S. Pat. No. 3,382,205 and include compositions containing different $R^1$ and $R^2$ groups. For example, in formula (1) the $R^1$ groups can be methyl, while the $R^2$ groups can be phenyl and/or beta-cyano-ethyl and/or trifluoropropyl.

Furthermore, within the scope of the definition of polydiorganosiloxanes useful in this invention are copolymers of various types of diorganosiloxane units, such as silanol chain-stopped copolymers of dimethylsiloxane units, diphenylsiloxane units and methylphenyl siloxane units, or, for example, copolymers of dimethylsiloxane units, methylphenylsiloxane units and methylvinyl siloxane units. Preferably, at least 50% of the $R^1$ and $R^2$ groups of the silanol chain-stopped polydiorganosiloxanes are alkyl, e.g., methyl groups.

In the above formula, $R^1$ and $R^2$ can be, for example, mononuclear aryl, halogen-substituted mononuclear aryl, alkyl, alkenyl, alkynyl, haloalkenyl, haloalkynyl, cycloalkyl, cycloalkenyl and alkyl and halogen substituted cycloalkyl and cycloalkenyl and cyano lower alkyl.

Further, it is contemplated that a mixture of various silanol chain-stopped polydiorganosiloxanes may also be employed as the silanol chain-stopped polydiorganosiloxane component.

The silanol chain-stopped polydiorganosiloxanes employed in the practice of the present invention may vary from low viscosity thin fluids to viscous gums, depending on the value of n and the nature of the particular organic groups represented by $R^1$ and $R^2$ of the above formula.

The viscosity of the silanol chain-stopped polydiorganosiloxanes thus varies broadly, e.g., in the range of from 20 to 1,000,000 cps at 25° C. Preferably, it will be in the range of from about 1000 to about 200,000 cps, and especially preferably from about 2000 to about 60,000 cps at 25° C.

The compositions of the present invention also comprise as part of polymeric component A a filler which is treated in situ. Fillers are commercially available in the form of relatively large aggregated particles, typically having an average size significantly greater than 300 nm. The preferred fillers are the silica fillers, such as, for example, fumed silica (90–325 m²/g surface area), and precipitated silica (80–150 m²/g surface area).

The fillers are generally employed in any effective amount. Preferably they are employed in amounts ranging from about 5 to about 200 parts, and more preferably, from about 10 to about 150 parts by weight per 100 parts of the silanol chain-stopped polydiorganosiloxane component.

The untreated fillers are combined with a relatively high viscosity unreactive silicone oil and treated therein with a treating agent, preferably an organosilicone or silazane to form a filler/oil masterbatch. These treating agents are described in the context of ex-situ treatment in Lucas, U.S. Pat. No. 2,938,009; Lichtenwalner, U.S. Pat. Nos. 3,004,859; and Smith, 3,635,743.

The preferred treating agents are organosilazanes and/or cycloorganosilazanes such as hexamethyldisilazane, 1,3-divinyl-1,1,3,3-tetramethyldisilazane, hexamethylcyclotrisilazane, octamethylcyclotetrasilazane and mixtures of any of the foregoing. Most preferred is hexamethyldisilazane.

The treating agent is generally added to the filler/oil mixture in amounts ranging from about 0.1 to about 10, more preferably from about 0.5 to about 5 percent by weight based on the weight of the filler and oil taken together.

The relatively high viscosity unreactive silicone oils of the present invention are typically organosiloxane polymers, generally having a viscosity of from 350 to about 10,000 centipoise, preferably from about 400 to about 5000 cps. The unreactive polyorganosiloxanes useful in the practice of the present invention are generally random polymers containing alkyl or vinyl substituted siloxane units. Particularly preferred are trimethyl or dimethyl vinyl terminated polydiorganosiloxanes, such as trimethyl terminated polydimethylsiloxane having a viscosity of about 500 cps.

Essential to the present invention is the rapid mixing of the filler, oil and filler treating agent in a mixer, such as a Drais mixer, a planetary mixer or a sigma bladed dough-mixer. Other commercial mixers useful in the practice of the present invention are the Processal and Littleford mixers. By rapid mixing is meant mixing in a mixer with sufficient close tolerances between the wall and the mixing blades' surfaces (300 nm or less) and capable of shaft speeds in the range of 5 to 200 rpm, such that sufficient breaking of filler aggregates can be achieved, i.e. on the order of less than about 300 nm, typically from about 100 to about 300 nm, and more typically from about 100 to about 200 nm; in time periods of less than about 24 hours, preferably less than about 14 hours.

Component A may also comprise an effective amount of water. Preferably, component A comprises from about 0.01 to about 0.5 weight percent water based on the weight of said silanol chain stopped polydiorganosiloxane.

Another optional component which may be present in component A of the two component RTV compositions is a relatively low viscosity unreactive silicone oil, which has a lower viscosity than the relatively high viscosity unreactive silicone oil employed in the filler/oil masterbatch. The unreactive silicone oils of the present invention are typically organosiloxane polymers, generally having a viscosity of from 10 to about 10,000 centipoise, preferably from about 20 to about 1000 cps. The unreactive polyorganosiloxanes useful in the practice of the present invention are generally random polymers containing alkyl and/or phenyl substituted siloxane units.

The alkyl substituted polyorganosiloxanes are of the general formula:

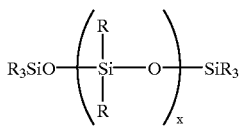

wherein R is an alkyl group, most preferably methyl; and x is a number such that the viscosity of the polymer ranges from about 20 to about 1000 centipoises.

The phenyl substituted polyorganosiloxanes are of the general formula:

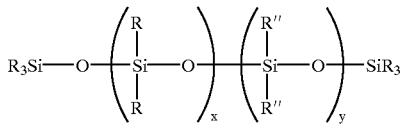

wherein R is an alkyl group, preferably methyl; R" is phenyl; wherein y is an integer such that the phenyl siloxane units are present in an amount ranging from about 1 to about 30 mole percent, preferably from about 5 to about 6 mole percent; and wherein x+y equals a number such that the viscosity of the phenyl substituted polyorganosiloxane ranges from about 500 to about 5000 centipoise.

The polyorganosiloxanes of the present invention are prepared by methods known to those skilled in the art or are available commercially. They can typically be prepared by the hydrolysis of the corresponding chlorosilanes followed by acid or based catalyzed equilibration.

It is further contemplated to employ untreated extending fillers in the compositions of the present invention. Illustrative of the many fillers which can be employed as extending fillers with the compositions of the present invention are titanium dioxide, lithophone, zinc oxide, zirconium silicate, silica aerogel, iron oxides (Fe$_2$O$_3$, Fe$_3$O$_4$), diatomaceous earth, calcium carbonate, fumed silica, precipitated silica, glass fibers, magnesium oxide, chromic oxide, zirconium oxide, aluminum oxide, crushed quartz, calcined clay, asbestos, carbon, graphite, cork, cotton, synthetic fibers, etc. Among the most useful fillers are ground quartz or mixtures thereof with volcanic glasses, fused silicas, other crystalline silicas and other mineral fillers such as calcium carbonate, talc, etc.

In the second component of the two component RTV silicone composition, there is included a condensation cure catalyst. The catalyst may be any of those known to be useful for promoting the reaction between the silanol chain-stopped diorganopolysiloxane and the crosslinking agent. The condensation catalysts are generally selected from tin compounds, zirconium compounds and titanium compounds, or mixtures thereof, although other metal and nonmetal catalysts may be useful in the practice of the present invention.

Effective amounts of the condensation catalysts which can be used in the practice of the present invention to facilitate the cure of the RTV compositions are, for example, from about 0.001 to about 2.5 parts by weight based on 100 parts by weight of the silanol chain-stopped polydiorganosiloxane component. More particularly and by way of illustration, the condensation catalyst may be a tin compound, for example, dibutyltindilaurate, dibutyltindiacetate, dibutyltinmethoxide, dibutyltinbis-(acetylacetonate), carbomethoxyphenyltintris-suberate, tin octoate, isobutyltin triceroate, dimethyltindi-butyrate, dimethyltindineodecanoate, triethyltintartrate, dibutyltin dibenzoate, dibutyltin oxide, tin oleate, tin naphthenate, butyltintri-2-ethylhexoate, tinbutyrate and mixtures of any of the foregoing. The preferred condensation catalysts are tin compounds, and dibutyltindilaurate, dibutyltin naphthalate and dibutyl-tindiacetate are particularly preferred.

Titanium compounds which can be used in the practice of the present invention are, for example, 1,3-dioxypropanetitanium bis(acetylacetonate), diisopropoxytitanium bis(acetylacetonate), titanium naphthenate, tetrabutyltitanate, tetra-2-ethylhexyltitanate, tetraphenyltitanate, tetraoctadecyltitanate, and ethyltriethanoaminotitanate.

Further examples of metal condensation catalysts are, for example, lead 2-ethyloctoate, iron-2-ethylhexoate, cobalt 2-ethylhexoate, manganese 2-ethylhexoate, zinc 2-ethylhexoate, antimony octoate, bismuth naphthenate, zinc naphthenate, zinc stearate and mixtures of any of the foregoing. Still further examples include zirconium compounds, for example, zirconium octoate.

Examples of nonmetal condensation catalysts are hexylammonium acetate and benzyltrimethylammonium acetate and mixtures thereof.

The second component of the RTV compositions of the present invention also comprises a crosslinking agent, which is typically a trifunctional ("T") or tetrafunctional ("Q") hydroxy reactive silane. These are generally of the formula

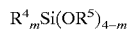

wherein R$^4$ is an organic radical of up to 8 carbon atoms selected from hydrocarbyl, halohydrocarbyl and cyano lower alkyl and R$^5$ is an organic radical of 1 to 30 carbon atoms selected from hydrocarbyl and halohydrocarbyl, and m has a value of 0 to 3 and preferably 0 to 1.

Illustrative organotrialkoxy silanes useful as crosslinkers in the present invention include CH$_3$Si(OCH$_3$)$_3$
CH$_3$Si(OCH$_2$CH$_3$)$_3$
CH$_3$Si(OCH$_2$CH$_2$CH$_3$)$_3$
CH$_3$CH$_2$Si(OCH$_3$)$_3$
CH$_3$CH$_2$Si(OCH$_2$CH$_3$)$_3$
CH$_2$=CH$_2$Si(OCH$_3$)$_3$

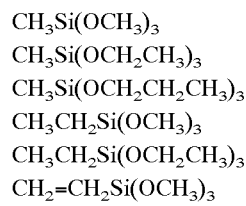

CH$_3$CH$_2$CH$_2$CH$_2$CH$_2$CH$_2$CH$_2$CH$_2$Si(OCH$_3$)$_3$
CF$_3$CH$_2$Si(OCH$_3$)$_3$
(CH$_3$)Si(OCH$_2$CH$_2$CH$_3$)$_3$
NCCH$_2$CH$_2$Si(OCH$_3$)$_3$

These organotrialkoxysilanes are suitably described by Berridge in U.S. Pat. No. 2,184,555, assigned to the same assignee as the present invention.

Illustrative of useful organotriacyloxysilane crosslinking agents for use in the present invention are the following:

CH$_3$Si(OC(O)CH$_3$)$_3$
CH$_3$CH$_2$Si(OC(O)CH$_3$)$_3$ $CH_2=CH_2Si(OC(O)CH_3)_3$

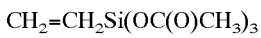

$CH_3Si(OC(O)(CH_2)_4CH_3)_3$

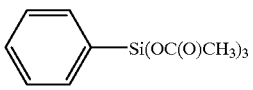

$CH_3(CH_2)_6CH_2Si(OC(O)(CH_2)_4CH_3)_3$
$CF_3(CH_2)_2Si(OC(O)(CH_2)_4CH_3)_3$
$NCCH_2CH_2Si(OC(O)(CH_2)_4CH_3)_3$
$CH_3Si(OC(O)CH(C_2H_5)(CH_2)CH_3)_3$

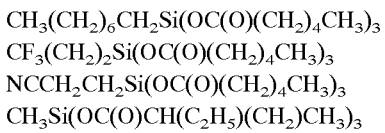

These silanes are also well known in the art and can be made by techniques disclosed, for example, in Beers, U.S. Pat. No. 3,382,205, assigned to the same assignee as the present invention.

Preferably, in the crosslinking agent, m has a value of 0 and the preferred silanes for use in the invention are tetra (n-propyl)silicate, tetraethylsilicate, "partially condensed" ethylsilicate—available commercially from Union Carbide, AKZO or HULS as ES-40 or Silbond 40.

The crosslinking agents are used in effective amounts to ensure a substantially cured composition. Preferably from about 0.25 to about 5 parts by weight of crosslinking agent based on 100 parts by weight of the silanol chain stopped polydiorganosiloxane are employed.

The B component of the present invention, i.e., the condensation catalyst and crosslinking agent, are typically combined in a silicone oil, either M-stopped or vinyl-stopped, along with water and/or alcohols prior to addition to the first component of the two component RTV composition.

DESCRIPTION OF THE EMBODIMENTS OF THE PRESENT INVENTION

The following examples illustrate the present invention. They are not to be construed to limit the scope of the appended claims in any manner whatsoever.

EXAMPLE 1

53.4 parts by weight of a 500 cps M stopped silicone oil (SF96-500 by General Electric Company), 5.35 parts by weight of water and 5.66 parts by weight of hexamethyldisilazane (HMDZ) are added to a high shear Drais 10 liter mixer and mixed under nitrogen for 10 minutes. After this mixing, 35.59 parts by weight of a hydrophilic fumed silica filler (Degussa A-130, 130 m²/g) are added at a rate the batch can accept at 25 rpm mixer shaft speed.

After the addition of the filler, the batch is heated under reflux to 110° C. When the filler begins to mass with the silicone oil an increase in the amperage of the mixer motor is observed. At 110° C. the reflux is stopped and the batch is placed under full vacuum while heating is continued to 140° C. The batch is then maintained at 140° C. under vacuum for 1 additional hour. At the end of 1 hour, the vacuum is broken and the batch is cooled to 120° C.

A filler/oil masterbatch is then recovered.

EXAMPLE 2

55.86 parts by weight of a 500 cps M stopped silicone oil (SF96-500 by General Electric Company), 0.99 parts by weight of water and 1.97 parts by weight of hexamethyldisilazane (HMDZ) are added to a high shear Drais 10 liter mixer and mixed for 10 minutes under nitrogen. 37.23 parts by weight of a hydrophilic fumed silica filler (Degussa A-130, 130 m²/g) are then added at a rate the batch can accept at 25 rpm mixer shaft speed. The batch is then heated to 110° C. at a shaft speed of 125 rpm under full reflux. The batch is then cooled to below 30° C., and purged with nitrogen. After purging, an additional 3.95 parts by weight of HMDZ are added to the batch.

After the second addition of the HMDZ, the batch is heated under reflux to 110° C. When the filler begins to mass with the silicone oil an increase in the amperage of the mixer motor is observed. At 110° C. the reflux is stopped and the batch is placed under full vacuum while heating is continued to 140° C. The batch is then maintained at 140° C. under vacuum for 1 additional hour. At the end of 1 hour, the vacuum is broken and the batch is cooled to 120° C.

A filler/oil masterbatch is then recovered.

EXAMPLE 3

55.31 parts by weight of a 500 cps M stopped silicone oil (SF96-500 by General Electric Company) are added to a high shear Drais 10 liter mixer along with 1.95 parts by weight of hexamethyldisilazane (HMDZ) and mixed for 10 minutes under nitrogen. 36.87 parts by weight of a hydrophilic fumed silica filler (Degussa A-130, 130 m²/g) are then added at a rate the batch can accept at 25 rpm mixer shaft speed. The batch is heated to 110° C. at a shaft speed of 125 rpm under full reflux. The batch is then cooled to below 30° C., and purged with nitrogen. After purging, an additional 5.86 parts by weight of HMDZ are added to the batch.

After the second addition of the HMDZ, the batch is heated under reflux to 110° C. When the filler begins to mass with the silicone oil an increase in the amperage of the mixer motor is observed. At 110 ° C. the reflux is stopped and the batch is placed under full vacuum while heating is continued to 140° C. The batch is then maintained at 140° C. under vacuum for 1 additional hour. At the end of 1 hour, the vacuum is broken and the batch is cooled to 120° C.

A filler/oil masterbatch is then recovered.

EXAMPLE 4

55.31 parts by weight of a 500 cps M stopped silicone oil (SF96-500 by General Electric Company) are added to a high shear Drais 10 liter mixer along with 1,95 parts by weight of hexamethyldisilazane (HMDZ) and mixed for 10 minutes under nitrogen. 36.87 parts by weight of a hydrophilic fumed silica filler (Degussa A-130, 130 m²/g) are then added at a rate the batch can accept at 25 rpm mixer shaft speed. The batch is heated to 110° C. at a shaft speed of 125 rpm under full reflux. The batch is then cooled to below 30° C., and purged with nitrogen. After purging, an additional 5.86 parts by weight of HMDZ are added to the batch.

After the second addition of the HMDZ, the batch is heated under reflux to 110° C. When the filler begins to mass with the silicone oil an increase in the amperage of the mixer motor is observed. At 110° C. the reflux is stopped and the batch is placed under full vacuum while heating is continued to 140° C. The batch is then maintained at 140° C. under vacuum for 1 additional hour. At the end of 1 hour, the vacuum is broken and the batch is cooled to 120° C.

A filler/oil masterbatch is then recovered.

EXAMPLE 5

53.4 parts by weight of a 500 cps M stopped silicone oil (SF96-500 by General Electric Company) and 5.35 parts by weight of water are added to a high shear Drais 10 liter mixer and mixed under nitrogen for 10 minutes along with 5.66 parts by weight of hexamethyldisilazane (HMDZ). After this mixing, 35.59 parts by weight of a hydrophilic fumed silica filler (Degussa A-130, 130 m$^2$/g) are added at a rate the batch can accept at 25 rpm mixer shaft speed.

After the addition of the filler, the batch is heated under reflux to 110° C. When the filler begins to mass with the silicone oil an increase in the amperage of the mixer motor is observed. At 110° C. the reflux is stopped and the batch is placed under full vacuum while heating is continued to 140° C. The batch is then maintained at 140° C. under vacuum for 1 additional hour. At the end of 1 hour, the vacuum is broken and the batch is cooled to 120° C.

A filler/oil masterbatch is then recovered.

EXAMPLE 6

48.79 parts by weight of a 500 cps M stopped silicone oil (SF96-500 by General Electric Company) and 4.89 parts by weight of water are added along with 5.17 parts by weight of hexamethyldisilazane (HMDZ) to a high shear Drais 10 liter mixer and mixed for 10 minutes under nitrogen. After this mixing, 32.53 parts by weight of a hydrophilic fumed silica filler (Degussa A-130, 130 m$^2$/g) are added at a rate the batch can accept at 25 rpm mixer shaft speed.

After the addition of the filler, the batch is heated under reflux to 110° C. When the filler begins to mass with the silicone oil an increase in the amperage of the mixer motor is observed. At 110° C. the reflux is stopped and the batch is placed under full vacuum while heating is continued to 140° C. The batch is then maintained at 140° C. under vacuum for 1 additional hour. At the end of 1 hour, the vacuum is broken and the batch is cooled to 70° C.

An additional 8.62 parts by weight of a 50 cps M stopped silicone oil (SF96-50 by General Electric Company) are then added and the resulting mixture is mixed for 20 minutes.

A filler/oil masterbatch is then recovered.

EXAMPLE 7

54.25 parts by weight of a 500 cps M stopped silicone oil (SF96-500 by General Electric Company) are added to a high shear Drais 10 liter mixer along with 1.92 parts by weight of hexamethyldisilazane (HMDZ) and mixed for 10 minutes under nitrogen. 36.16 parts by weight of a hydrophilic fumed silica filler (Degussa A-130, 130 m$^2$/g) are then added at a rate the batch can accept at 25 rpm mixer shaft speed. The batch is heated to 110° C. at a shaft speed of 125 rpm under full reflux. The batch is cooled to below 30° C. and purged with nitrogen, at which time an additional 5.75 parts by weight of HMDZ are added. The batch is again heated to 110° C. under reflux, at which time a vacuum is applied and the batch is stripped to 130–140° C. and maintained at 130–140° C. for 1 hour. The batch is cooled and 1.92 parts by weight of HMDZ are added.

After the addition of the HMDZ, the batch is again heated 140° C. and stripped for 1 hour under full vacuum. At the end of the stripping the vacuum is broken and the batch is cooled to below 20° C.

A filler/oil masterbatch is then recovered.

EXAMPLE 8

52.41 parts by weight of a 500 cps M stopped silicone oil (SF96-500 by General Electric Company) and 5.25 parts by weight of water along with 5.56 parts by weight of hexamethyldisilazane (HMDZ) are added to a high shear Drais 10 liter mixer and mixed for 10 minutes under nitrogen. After this mixing, 34.94 parts by weight of a hydrophilic fumed silica filler (Degussa A-130, 130 m$^2$/g) are added at a rate the batch can accept at 25 rpm mixer shaft speed. The batch is heated to 110° C. at a shaft speed of 125 rpm under full reflux. At 110° C. the reflux is stopped and heating is continued under full vacuum to strip the batch to 130–140° C. Stripping is continued for 1 hour at 130–140° C. The batch is cooled to 30° C. and an additional 1.85 parts by weight of HMDZ are added. The batch is heated 1 hour under reflux and then heated again to 140° C. and stripped for 1 hour under full vacuum. The batch vacuum is then broken and the batch is cooled to 20–30° C.

A filler/oil masterbatch is then recovered.

EXAMPLE 9

48.79 parts by weight of a 500 cps M stopped silicone oil (SF96-500 by General Electric Company) and 4.89 parts by weight of water along with 5.17 parts by weight of hexamethyldisilazane (HMDZ) are added to a high shear Drais 10 liter mixer and mixed under nitrogen for 10 minutes. After this mixing, 32.53 parts by weight of a hydrophilic fumed silica filler (Degussa A-130, 130 m$^2$/g) are added at a rate the batch can accept at 25 rpm mixer shaft speed.

After the addition of the filler, the batch is heated under reflux to 110° C. When the filler begins to mass with the silicone oil an increase in the amperage of the mixer motor is observed. At 110° C. the reflux is stopped and the batch is placed under full vacuum while heating is continued to 140° C. The batch is then maintained at 140° C. under vacuum for 1 additional hour. At the end of 1 hour, the vacuum is broken and the batch is cooled to 70° C.

An additional 8.62 parts by weight of silanol stopped polydimethylsiloxane having a viscosity of 30,000 cps are then added and the resulting mixture is mixed for 20 minutes.

A filler/oil masterbatch is then recovered.

EXAMPLE 10

48.79 parts by weight of a 500 cps M stopped silicone oil (SF96-500 by General Electric Company) and 4.89 parts by weight of water along with 5.17 parts by weight hexamethyldisilazane (HMDZ) are added to a high shear Drais 10 liter mixer and mixed under nitrogen for 10 minutes. After this mixing, 32.53 parts by weight of a hydrophilic fumed silica filler (Degussa A-130, 130 m$^2$/g) are added at a rate the batch can accept at 25 rpm mixer shaft speed.

After the addition of the filler, the batch is heated to 70–80° C. and held at these temperatures, under reflux, for 2 hours. When the filler begins to mass with the silicone oil an increase in the amperage of the mixer motor is observed. At the end of 2 hours at 70–80° C. the batch is immediately placed under vacuum and brought to 140° C. and held at this temperature for 1 hour. At the end of 1 hour, the vacuum is broken and the batch is cooled to 70° C. or lower.

An additional 8.62 parts by weight of a 50 cps M stopped silicone oil (SF96-50 by General Electric Company) are then added and the resulting mixture is mixed for 20 minutes.

A filler/oil masterbatch is then recovered.

EXAMPLE 11

48.79 parts by weight of a 500 cps M stopped silicone oil (SF96-500 by General Electric Company) and 4.89 parts by weight of water along with 5.17 parts by weight of hexamethyldisilazane (HMDZ) are added to a high shear Drais 10 liter mixer and mixed under nitrogen for 10 minutes. After this mixing, 32.53 parts by weight of a hydrophilic fumed silica filler (Degussa A-130, 130 m$^2$/g) are added at a rate the batch can accept at 25 rpm mixer shaft speed.

After the addition of the filler, the batch is heated under reflux to 110° C. When the filler begins to mass with the silicone oil an increase in the amperage of the mixer motor is observed. At 110° C. the reflux is stopped and the batch is placed under full vacuum while heating is continued to 140° C. The batch is then maintained at 140° C. under vacuum for 1 additional hour. At the end of 1 hour, the vacuum is broken and the batch is cooled to 70° C.

An additional 7.33 parts by weight of SF96-50 and 1.29 parts of a D6 silanol terminated siloxane (M'D$_6$M' wherein M' represents a silanol terminated trifunctional siloxane and D represents a dimethylsiloxane) are then added together and the resulting mixture is mixed for 20 minutes.

A filler/oil masterbatch is then recovered.

EXAMPLE 12

53.4 parts by weight of SF96-500 and 5.35 parts by weight of water along with 2.00 parts by weight of HMDZ are added to the Drais high shear mixer and mixed for 10 minutes under nitrogen. Then 35.59 parts of Degussa A-130 filler are added at a rate the batch will accept. At the end of filler addition, the batch is heated to 110° C. for 1 hour under reflux at which point the reflux is stopped and the batch is stripped under full vacuum to 140° C., at which temperature stripping is continued for 1 hour. At the end of 1 hour the vacuum is broken and the batch is cooled to 120° C.

A filler/oil masterbatch is then recovered.

EXAMPLES 13–20

The masterbatches of Examples 2, 3, 4, 6, 7 and 9, and masterbatches prepared in accordance with Example 6 except in Drais 25 liter and 3000 liter mixers are tested for viscosity using a Brookfield Model HBF Spindle 5 viscometer. Comparisons are made with a Treco material of similar composition prepared by in-situ treatment of the filler at low shear mixing conditions. The results are set forth in Table 1 below.

TABLE 1

| | | | | | Example | | | | |
|---|---|---|---|---|---|---|---|---|---|
| | A* | 13 | 14 | 15 | 16 | 17 | 18 | 19 | 20 |
| | | | | | Masterbatch[a] | | | | |
| Viscosity | Treco | 2 | 3 | 4 | 5 | 6 | 7 | 6[b] | 6[c] |
| 10 rpm, cps | >320000 | >320000 | >320000 | >320000 | 118400 | >320000 | >320000 | 102400 | 80000 |
| 5 rpm, cps | 224000 | 640000 | >640000 | 433000 | 96000 | >640000 | 284000 | 102400 | 102400 |
| 2 rpm, cps | 224000 | 784000 | 734000 | 576000 | 104000 | 320000 | 336000 | 129600 | 145600 |
| 1 rpm, cps | 307000 | 704000 | 752000 | 819000 | 144000 | 272000 | 464000 | 176000 | 208000 |

*= Comparative Example
[a] = refers to Masterbatch example number
[b] = Masterbatch prepared according to procedure of Example 6 in 25 liter Drais mixer
[c] = Masterbatch prepared according to procedure of Example 6 in 3000 liter Drais mixer From Table 1 it can be seen that the masterbatches of Examples 16–20 had rheologies similar to those of the Treco material.

EXAMPLES 21–40

The various filler oil masterbatches are then evaluated for physical properties as RTV test compounds. The RTV test compounds are all prepared by the following procedure. 30 weight percent of 30,000 cps silanol stopped polydimethylsiloxane (PDMS) polymer is added to a high shear mixer such as a Drais, a planetary mixer or a sigma bladed doughmixer. To the silanol stopped PDMS polymer is then added 25 weight percent of the filler/oil masterbatch. Then 35 weight percent of 5 micron Minusil ground quartz is added in portions and mixed. Then 10 weight percent of SF96-50 M-stopped PDMS oil is added and mixing is continued.

The test formula is cured by addition of a standard tin catalyzed alkoxysilane crosslinker cure agent system (hereinafter referred to as C catalyst). The cure agent system contains 19.63 weight percent dibutyl tin dilaurate, 11.45 weight percent of n-propanol, 0.23 weight percent water and 68.69 weight percent of n-propylsilicate. The cure agent system is used in amounts ranging between 1 to 5 percent by weight of the test formula.

For comparative purposes, the Treco material is also cured using a Treco catalyst, L5W (also known as Beta 6 when sold with RTV 420 or 410) which similarly contains and organotin such as dibutyl tin dilaurate, and a cross linker such as tetra-n-propylsilicate or tetra-ethylorthosilicate.

These compounds are tested for Shore A durometer, tensile strength, tensile elongation and Die B tear strength according to ASTM methods. The results are set forth in Table 2 below.

TABLE 2

| Example | B* | 21 | 22 | C* | 23[a] | 24 | 25 | 26 | 27 | 28 | 29 | 30 | 31 |
|---|---|---|---|---|---|---|---|---|---|---|---|---|---|
| Composition | | | | | | | | | | | | | |
| O/F Mbx[b] | Treco | 1 | 2 | Treco | 3 | 1 | 4 | 5 | 3 | 2 | 3 | 3 | 6 |
| Age of O/F Mbx, days | 1 | 1 | 1 | 1 | 1 | 1 | 66 | 1 | 1 | 1 | 1 | 1 | 1 |
| Curing Agent, type | B | C | B | C | A | A | A | B | B | A | A | B | B |
| Curing Agent, wt. % | 5 | 2.5 | 5 | 1.25 | 5 | 5 | 5 | 5 | 5 | 3 | 3 | 3 | 5 |
| Age of Test Formula[c] | 1 | 5 | 1 | 1 | 1 | 16 | 1 | 1 | 7 | 12 | 13 | 13 | 1 |
| Curing, hrs | 36 | 36 | 36 | 36 | 36 | 36 | 36 | 36 | 36 | 36 | 36 | 36 | 36 |
| Physical Properties | | | | | | | | | | | | | |
| Viscosity[d], cps | 46500 | 42800 | 33000 | 34500 | 38000 | 42800 | 44000 | 35000 | 47500 | 33000 | 47500 | 39500 | 34000 |
| Shore A | 16 | 22 | 12 | 14 | 20 | 19 | 20 | 20 | 20 | 19 | 21 | 18 | 20 |
| Avg. Tensile, psi | 478 | 582 | 449 | 514 | 433 | 510 | 488 | 542 | 447 | 548 | 486 | 495 | 549 |
| Avg. Elongation, % | 520 | 480 | 654 | 563 | 431 | 548 | 466 | 634 | 469 | 577 | 420 | 490 | 644 |
| Ave Die B Tear, pli | 87 | 166 | 113 | 122 | 66 | 128 | 83 | 149 | 59 | 73 | 95 | 131 | 150 |
| Tear 1 | 44 | 173 | 115 | 145 | 28 | 143 | 79 | 153 | 36 | 44 | 116 | 132 | 143 |
| Tear 2 | 127 | 171 | 114 | 142 | 42 | 133 | 28 | 155 | 72 | 45 | 79 | 141 | 155 |
| Tear 3 | 48 | 151 | 116 | 55 | 29 | 95 | 30 | 144 | 64 | 155 | 123 | 129 | 156 |
| Tear 4 | 127 | 168 | 109 | 145 | 123 | 139 | 130 | 152 | 64 | 48 | 95 | 121 | 154 |
| Tear 5 | | | 131 | | 113 | | 82 | 155 | | | | | 150 |
| Tear 6 | | | 117 | | 29 | | 108 | 147 | | | | | 153 |
| Tear 7 | | | 71 | | 88 | | 88 | 153 | | | | | 153 |
| Tear 8 | | | 119 | | 29 | | 89 | 153 | | | | | 142 |
| Tear 9 | | | 127 | | 116 | | 110 | 133 | | | | | 145 |

| Example | 32 | 33 | 34 | 35 | 36 | 37 | 38 | 39 | 40 | 40A[e] |
|---|---|---|---|---|---|---|---|---|---|---|
| Composition | | | | | | | | | | |
| O/F Mbx[b] | 6 | 1 | 1 | 7 | 8 | 9 | 11 | 12 | 12 | 10 |
| Age of O/F Mbx, days | 44 | 43 | 43 | 0 | 0 | 0 | 1 | 1 | 1 | 1 |
| Curing Agent, type | B | B | B | B | B | B | A | A | C | C |
| Curing Agent, wt. % | 5 | 5 | 5 | 5 | 5 | 5 | 5 | 5 | 2.5 | 2.5 |
| Age of Test Formula[c] | 1 | 1 | 1 | 1 | 1 | 1 | 1 | 1 | 1 | 1 |
| Curing, hrs | 36 | 36 | 36 | 36 | 36 | 36 | 36 | 36 | 36 | 36 |
| Physical Properties | | | | | | | | | | |
| Viscosity[d], cps | 151250 | 24400 | 24400 | 65500 | 56750 | 42750 | 57300 | 42000 | 42000 | 31500 |
| Shore A | 20 | 29 | 12 | 22 | 20 | 20 | 23 | 21 | 27 | 17 |
| Avg. Tensile, psi | 555 | 651 | 427 | 496 | 530 | 585 | 582 | 622 | 660 | 441 |
| Avg. Elongation, % | 562 | 467 | 541 | 457 | 520 | 519 | 418 | 415 | 396 | 323 |
| Ave Die B Tear, pli | 85 | 189 | 104 | 75 | 119 | 154 | 79 | 153 | 158 | 110 |
| Tear 1 | 152 | 195 | 122 | 38 | 146 | 170 | 137 | 167 | 156 | 125 |
| Tear 2 | 170 | 190 | 131 | 56 | 131 | 45 | 45 | 145 | 146 | 113 |
| Tear 3 | 51 | 156 | 115 | 37 | 127 | 155 | 151 | 133 | 163 | 93 |
| Tear 4 | 45 | 197 | 114 | 36 | 133 | 166 | 45 | 182 | 186 | 132 |
| Tear 5 | 144 | 184 | 41 | 145 | 96 | 177 | 45 | 182 | 186 | 121 |
| Tear 6 | 52 | 194 | 124 | 57 | 59 | 166 | 46 | 159 | 148 | 115 |
| Tear 7 | 51 | 186 | 120 | 36 | 125 | 166 | 151 | 151 | 161 | 109 |
| Tear 8 | 48 | 202 | 47 | 130 | 127 | 165 | 45 | 261 | 150 | 112 |
| Tear 9 | 51 | 197 | | | 127 | 173 | 47 | 133 | 162 | 111 |

*= Comparative Example
[a]= Sicron B800 used in place of 5 micron Minusil in formulation
[b]= Oil/Filler masterbatch, refers to Example No.
[c]= Number of days before cure
[d]= Brookfield RVF 5 at 4 rpm
[e]= Test formula the same as Example 40 except 1.26% more silanol terminated polymer, 0.4% less oil/filler masterbatch, 8.2% less 5 micron quartz, 5.7% more SF96-50 oil, 1.6% Tullanox HM250D hexamethyldisilazane treated precipitated silica filler
A = Beta 6 catalyst
B = L5W catalyst
C = C catalyst From Table 2 above, it can be seen that the RTV compositions of the present invention produced compositions having significantly improved physical properties compared to the Treco materials. Examples 21, 23, 25, 26, 27, 29 31, 33, 35, 36, 37, 38 39 and 40 all had Shore A durometer values of 20 or more. Further, Examples 21, 22, 24, 26, 30, 31, 33, 34, 36, 37, 39 and 40 all had Average Die B Tear strength values of 100 pli or greater. Of these, Examples 21, 26, 31, 33, 36, 37, 39 and 40 had both, a Shore A durometer value of above 20 and an Average Die B Tear strength of above 100 pli.

EXAMPLES 41–47

Various test formulations are prepared using traditional mixing equipment of the planetary or sigma bladed dough mixer types and are tested for viscosity with room temperature aging. The results are set forth below in Table 3.

TABLE 3

| Example | D* | 41 | 42 | 43 | 44 | 45 | 46 | 47 |
|---|---|---|---|---|---|---|---|---|
| Composition | | | | | | | | |
| F/O MBX | Treco | 3 | 3 | 5 | 6 | 1 | 11 | 12 |
| Test Compound | B* | 23 | 30 | 26 | 31 | 34 | 38 | 39 |
| Viscosity, cps | | | | | | | | |
| 0 days | 34500 | 38000 | 47500 | 35000 | 39500 | 22750 | 57300 | 42000 |
| 1 | | 50000 | 60000 | 52900 | 56750 | 24400 | | 62500 |
| 2 | 36500 | | | | | | | |
| 3 | 36900 | | | 51500 | | | 70500 | |
| 7 | | 48500 | 58600 | | | | | |
| 8 | 38800 | | | | | | | |
| 13 | 40900 | | | | | | | |
| 30 | | | | | | | | 79500 |
| 31 | | | | | 52000 | | | |
| 34 | | | | | | | 174000 | |
| 36 | | | | | | 22500 | | |
| 38 | | | 58300 | | | | | |
| 44 | 53500 | | | | | | | |
| 52 | | | | | 62000 | | | |
| 64 | | | | 57000 | | | | |
| 66 | | | | | 66000 | | | |
| 73 | | | 65000 | | | | | |
| 78 | 69400 | | | | | | | |
| 82 | | | | | | 23250 | | |
| 104 | | | | | 72500 | | | |
| 113 | | | | 58500 | | | | |
| 127 | | 92500 | | | | | | |

*= Comparative Example
F/O MBX = Filler Oil Masterbatch, refers to Example Number above
Test Compound = Refers to Example Number above The data in Table 3 above show that the compositions of the present invention have excellent viscosity stability after a period of time compared to the Treco compounded material (see especially Example 43 v D*).

EXAMPLES 48–51

RTV compositions of the present invention are compared with Treco compositions with varying catalyst levels. In Examples 48 and 49, and Comparative Examples E and F, the C catalyst is used. In Examples 50 and 51, and Comparative Examples G and H, the A (Beta 6) catalyst is used. The results are set forth in Table 4 below.

TABLE 4

| Example | E* | F* | 48 | 49 | G* | H* | 50 | 51 |
|---|---|---|---|---|---|---|---|---|
| Composition | | | | | | | | |
| RTV$^a$ | C* | C* | 39 | 39 | C* | C* | 39 | 39 |
| Catalyst | | | | | | | | |
| Type | C | C | C | C | A | A | A | A |
| Amt, wt. % | 1 | 3 | 1 | 3 | 3 | 8 | 3 | 8 |
| Physical Properties | | | | | | | | |
| Shore A | 19 | 26 | 20 | 30 | 19 | 20 | 21 | 22 |
| Ave Tensile Strength at Break, psi | 640 | 640 | 720 | 600 | 636 | 469 | 690 | 608 |
| Elong, % | 470 | 470 | 520 | 325 | 465 | 341 | 471 | 385 |
| Ave Die B, pli | 37 | 31 | 164 | 67 | 32 | 28 | 163 | 159 |

*= Comparative Example
$^a$= refers to experimental number from Table 2
A = Beta 6 catalyst
C = C catalyst In the above data it can be seen that the RTV compositions of the present invention produce better physical properties than the Treco materials. To make the Treco material produce better tear values the catalyst level would have to be adjusted on a batch to batch basis, and also in many cases its level would have to be increased significantly.

EXAMPLES 52–54

As further evidence of the faster production time of the RTV compositions of the present invention over the Treco RTV compositions, the RTV compositions of the present invention are compared for viscosity stability under accelerated aging conditions at 70° C. The results are set forth in Table 5 below.

TABLE 5

| Example | I* | 52 | 53 | 54 |
|---|---|---|---|---|
| F/O MBX$^a$ | A* | 3 | 1 | 2 |
| Viscosity$^b$, days/70° C. age | | | | |
| 0 | 54,080 | 54,400 | 52,160 | 60,000 |
| 7 | 141,120 | 83,200 | 104,160 | 109,120 |
| 14 | 216,960 | 88,640 | 127,520 | 117,920 |
| 21 | 261,120 | 94,560 | 141,400 | 124,960 |
| 28 | 284,800 | 96,000 | 154,720 | 129,600 |
| 42 | 299,200 | 102,000 | 201,600 | 171,200 |
| 56 | 408,000 | 109,600 | 225,600 | 176,000 |
| 85 | 552,000 | 122,400 | 273,600 | 197,120 |

*Comparative Example
$^a$Filler/Oil Masterbatch, Example Number above
$^b$in centipoises Many variations of the present invention will suggest themselves to those skilled in the art in light of the above-detailed description. For example, the masterbatches may be prepared with a wide variety of reactive silicone oils. Further, a number of different silylating agents, such as trimethylsilyl trifluoromethanesulfonate, trimethylsilyl methanesulfonate, N,O-bis(trimethylsilyl) carbamate, bis(trimethylsilyl) acetamide, bis(trimethylsilyl) urea, t-butyl dimethylsilyl trifluoromethanesulfonate and chlorosilanes or bromosilanes used in silylating reactions, may be added to treat the fillers in situ. All such obvious modifications are within the full intended scope of the appended claims.

All of the above-referenced patents, patent applications and publications are hereby incorporated by reference.

What is claimed is:

1. A method of preparing the first component of a two component RTV silicone composition, said method consisting essentially of:
   (a) preparing a filler/oil masterbatch comprising:
      (i) adding an unreactive silicone oil and untreated agglomerated filler particles to a mixer;
      (ii) adding a filler treating agent selected from the group consisting of organosilanes, polymeric organosilanes and silazanes to said unreactive silicone oil/filler mixture; and
      (iii) mixing the treating agent and silicone oil/filler mixture at mixing conditions sufficient to break down the aggregated filler particles to an average size of less than 300 $\mu$m in a time period of less than about 24 hours to form a filler/oil masterbatch; and
   (b) adding said filler/oil masterbatch to a reactive silicone oil.

2. A method as defined in claim 1 wherein said unreactive silicone oil comprises a trimethyl or dimethyl vinyl terminated polydiorganosiloxane.

3. A method as defined in claim 2 wherein said unreactive silicone oil comprises a trimethyl terminated polydimethylsiloxane.

4. A method as defined in claim 1 wherein said untreated filler comprises aggregated particles of fumed silica.

5. A method as defined in claim 1 wherein said filler treating agent comprises hexamethyldisilazane.

6. A method as defined in claim 1 wherein water is also added to the filler/oil masterbatch.

7. A method as defined in claim 1 wherein said mixing conditions are sufficient to break down the aggregated filler particles to an average size of from about 100 to about 200 nm in a time period of less than about 14 hours.

8. A method as defined in claim 1 wherein said reactive silicone oil consists essentially of a silanol terminated polydimethylsiloxane.

9. A method as defined in claim 1 wherein said unreactive silicone oil is added in an amount ranging from about 30 to about 70 percent by weight, said filler is added in an amount ranging from about 70 to about 30 percent by weight; and said treating agent is added in an amount ranging from about 1 to about 7 percent by weight based on the weight of the unreactive silicone oil, filler and treating agent together.

10. A method as defined in claim 1 further consisting essentially of adding an extending filler to said first component.

* * * * *